(12) United States Patent
Ozaki

(10) Patent No.: US 6,185,339 B1
(45) Date of Patent: Feb. 6, 2001

(54) BIT STREAM ANALYZING METHOD AND APPARATUS

(75) Inventor: Nozomu Ozaki, Kanagawa (JP)

(73) Assignee: Sony Corporation, Tokyo (JP)

( * ) Notice: Under 35 U.S.C. 154(b), the term of this patent shall be extended for 0 days.

(21) Appl. No.: 09/158,034

(22) Filed: Sep. 22, 1998

(30) Foreign Application Priority Data

Sep. 24, 1997 (JP) .................................................. 9-258617

(51) Int. Cl.[7] .................................................. G06K 9/36
(52) U.S. Cl. .......................................................... 382/232
(58) Field of Search .................................. 382/232, 236,
382/238, 240, 242, 248, 250; 358/432,
433; 348/384, 394, 395, 400–404, 407–416,
420–421, 425, 430, 431, 699

(56) References Cited

U.S. PATENT DOCUMENTS

| | | | |
|---|---|---|---|
| 5,111,292 | * | 5/1992 | Kuriacose .............................. 348/405 |
| 5,122,875 | * | 6/1992 | Raychaudhuri et al. ............. 348/416 |
| 5,148,272 | * | 9/1992 | Acampora et al. ................... 348/415 |
| 5,168,356 | * | 12/1992 | Acampora et al. ................... 348/415 |
| 5,231,481 | * | 7/1993 | Eduzan et al. .......................... 358/60 |
| 5,253,053 | * | 10/1993 | Chu et al. ............................. 348/404 |
| 5,537,215 | * | 7/1996 | Niimura et al. ...................... 358/335 |
| 5,652,629 | * | 7/1997 | Gonzales et al. .................... 348/699 |
| 5,668,598 | * | 9/1997 | Linzer et al. ......................... 348/402 |

* cited by examiner

Primary Examiner—Jose L. Couso
(74) Attorney, Agent, or Firm—Frommer, Lawrence & Haug, LLP.; William S. Frommer

(57) ABSTRACT

The present invention enables to enhance a processing performance in analyzing a bit stream of decoding a variable-length code to be successively processed.

The present invention provides an MPEG video decoder for decoding an MPEG video stream including: a pre-purser 3 (bit stream divider) for detecting a slice start code of Slice layer and dividing a bit stream into two sub streams; video decoders 9 and 10 for decoding the sub streams separately from each other; a memory controller (memory interface) for combining with consistency the decoded data from the video decoders 9 and 10; and an external memory 4.

8 Claims, 4 Drawing Sheets

FIG.3A SUB STREAM 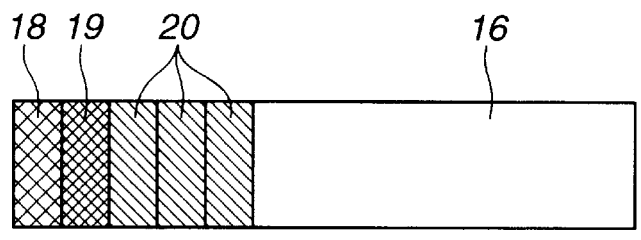
FIG.3B PREVIOUS BIT STREAM 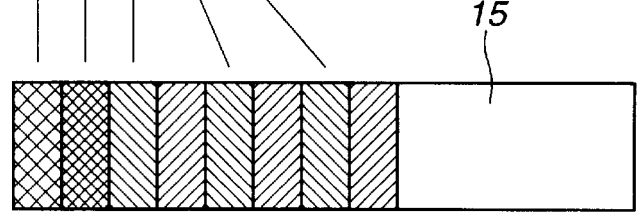
FIG.3C SUB STREAM 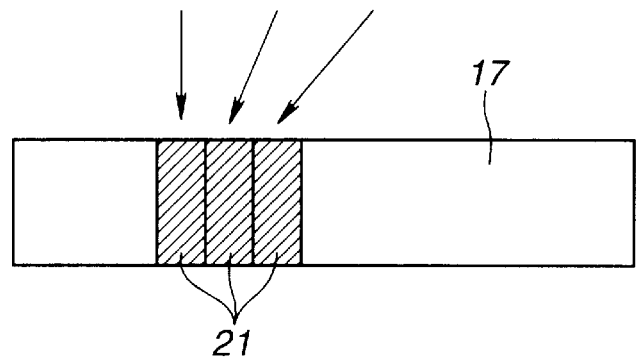

BIT STREAM ANALYZING METHOD AND APPARATUS

BACKGROUND OF THE INVENTION

1. Field of the Invention

The present invention relates to a bit stream analyzing method and apparatus for use in a decoder circuit for a high-speed decoding of a compressed bit stream generated by way of a variable-length encoding such as a video compression and an audio compression and addition of a header information, and in particular to those which can be applied to a variable-length encoder and a stream purser having a high bit rate which requires more than speed increase of a circuit.

2. Description of the Prior Art

In a conventional compression technique for a video data and audio data, for example, the data s subjected to an arithmetic conversion and the variable-length coding, after which a header information is added, thus generating a compressed bit stream.

When analyzing a compressed bit stream thus generated through a variable-length coding and addition of a header information and decoding the variable-length code contained in the bit stream, conventionally, a single bit stream analyzing apparatus has been used for analyzing the header information and decoding the variable-length code successively. In order to increase the speed of the bit stream analysis, especially, in order to increase the speed of decoding the variable-length code, various devices have been developed on a circuit.

In the aforementioned analysis of the bit stream, in order to increase the speed of analysis of the aforementioned header information, there has been used a method to increase the processing clock and the like.

On the other hand, in the aforementioned decoding of the variable-length code, a set of processing loops are required such as insert of a bit stream into a code table, read-out of a matched code, addition to a shift amount with a barrel shifter, shift with the barrel shifter, and the like. Consequently, it is difficult to increase the processing clock, for exzample, so as to increase the speed oft he decoding processing of the variable-length code. Moreover, a variable-length code is basically a one-dimensional bit stream which should be analyzed successively starting with its starting head and cannot be processed in parallel.

SUMMARY OF THE INVENTION

It is therefore an objectd of the present invention to provide a bit stream analyzing method and apparatus enabling, without requiring a high-speed clock or a high-speed circuit technique, to enhance a processing performance in analysis of a bit stream and decoding of a variable-length code which are to be processed successively.

The aforementioned object can be achieved by the bit stream analyzing and apparatus according to the present invention for analyzing a bit stream containing a compressed encode data and specific code patterns added different between predetermined units, wherein a specific code pattern of one unit is detected and according to the detection result, the bit stream is divided into a plurality of sub streams so that the plurality of sub streams are decoded separately from each other and the plurality of sub streams which have been decoded are combined with consistensy.

That is, according to the present invention, a specific code pattern detection (such as a header information processing) is carried out by pre-reading of a bit stream and according to this detection, the bit stream is divided into a pluarality of sub streams so that the sub streams are decoded in a parallel processing, thus enhancing the processing performance. Thus, the present invention can be applied in case a bit stream can be divided with a specific code pattern (such as a header information level). In the case of MPEG, for example, a bit stream is divided for each Slice.

According to another aspect of the present invention, there is provided a bit stream analyzing method and apparatus for analyzing a bit stream containing a Huffman-coded compressed data, wherein a data in the middle of the bit stream is shifted by one bit so as to be compared with a Huffman table to detect whether a match is present and according to a result of the match detection, a boundary of a Huffman code is detected, so that a dec-ode result starting at the boundary position is combined with a decode result started at the head of the bit stream, thus enabling to achieve the aforementioned object.

That is, the present invention relates to a bit stream division of a variable-length code by a decoder, wherein a pre-read of a bit stream is carried out at a head of the bit stream and in an appropriate position of the bit stream other than the head and the bit stream is entered into a Huffman decoder table. If a match is detected with any of the Huffman table value, the variable-length code decoding is carried out in the ordinary method. If no match is detected, the data is shifted by one bit so as to again detect whether a match is present. Thus, one-bit shift is carried out until a match in a Huffman table is detected. After a match is detected, a processing identical to the ordinary processing is carried out for a variable-length code decoding and a header processing so that a bit stream is analyzed in a plurality of blocks in parallel, thus enhancing the processing performance.

As has been described above, by parallel processing of a bit stream analysis, it is possible to improve the bit stream processing performance without requiring to increase the processing block clock frequency. These years, the operation speed has been increased by development of an LSI (large-scale integrated circuit), but there is a also a strong desire for reducing the power consumption by reducing the power source voltage. The parallel processing provided by the present invention also answers to such a desire.

BRIEF DESCRIPTION OF THE DRAWINGS

FIG. 3 shows an example of dividing a bit stream with a pre-purser 3 (bit stream divider) of FIG. 2.

DETAILED DESCRIPTION OF PREFERRED EMBODIMENTS

Description will now be directed to preferred embodiments of the present invention with reference to the attached drawings.

As a compression technique of international specifications, JPEG (Joint Photographic Coding Experts Group) and MPEG (Moving Picture Image Coding Experts Group) are widely used. An embodiment of the present invention will be explained in a case of the aforementioned MPEG compression technique. However, the present invention is not to be limited to the application to the MPEG but can be applied to various compression techniques. It should be noted that the term MPEG is an abbreviation of a discussion organization of ISO/IEC JTC1/SC29 (International Organization for Standardization/ International Electrotechnical Commission, Joint Technical Committee 1/Sub committee 29) for discussing a moving picture coding for storage. There are ISO11172 as MPEG1 and ISO13818 as MPEG2. In these international standards, ISO11172-1 and ISO13818-1 define the system multiplexing; ISO11172-2 and ISO13818-2 define the video coding; and ISO11172-3 and ISO13818-3 define the audio coding.

Firstly, before explaining specific contents of the present embodiment, a brief explanation will be given on the aforementioned MPEG. Moreover, in order to clarify a difference between the present invention and the current MPEG, a general technique for analyzing a bit stream will be described before explaining the bit stream analysis technique according to the present embodiment.

Figure 1:
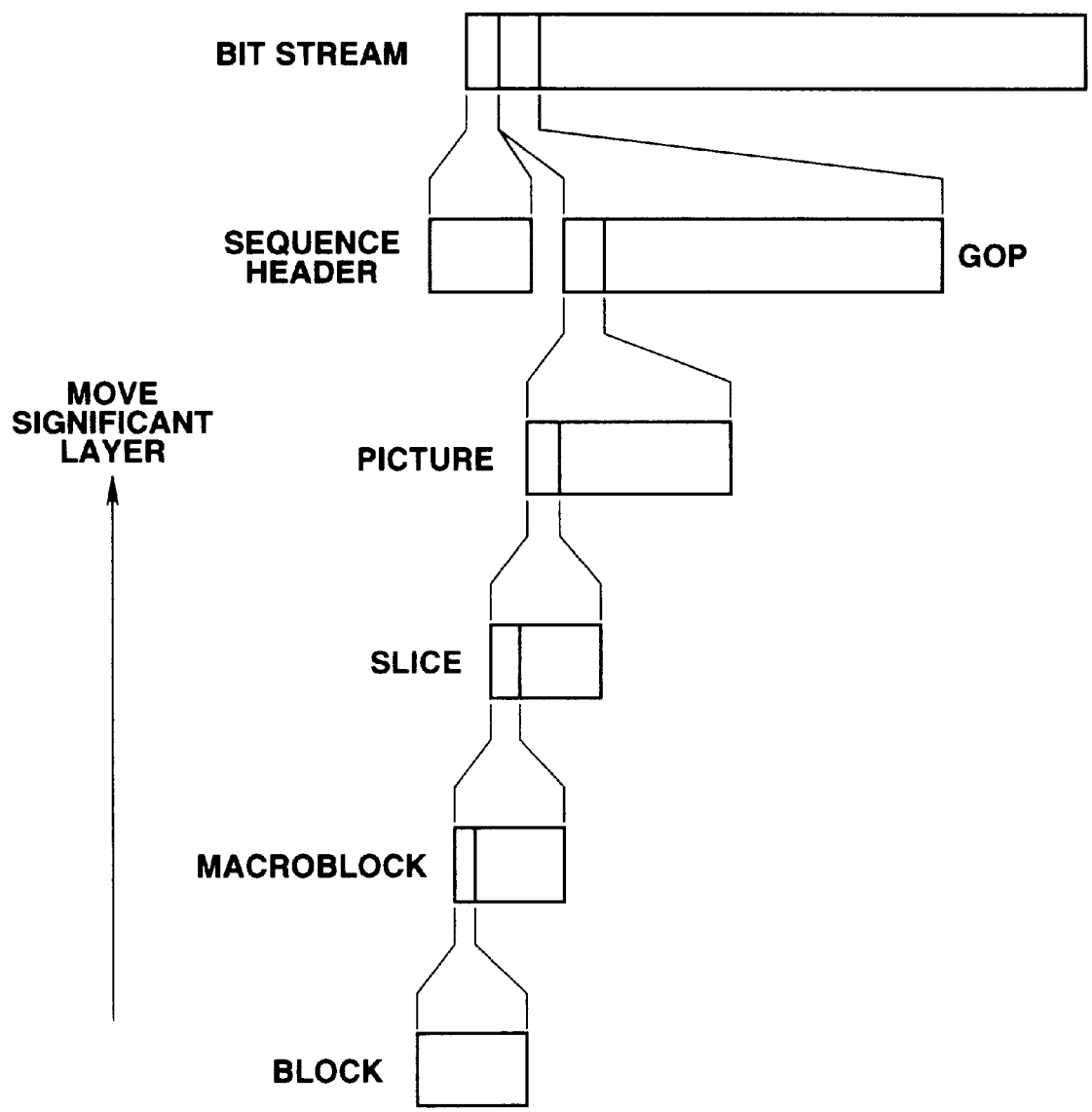
FIG. 1 shows a layer configuration in the MPEG.

In the MPEG, a compressed bit stream is layered into several predetermined units, i.e., layers. FIG. 1 shows this layered configuration in the MPEG. In this FIG. 1, the most significant bit stream contains a Sequence_header which indicates the content of this bit stream and a video data.

The video data, as shown in FIG. 1, has layers of GOP (Group_of_picture), Picture, Slice, Macroblock, Block, and the like. The Picture layer corresponds to one frame or a one-field data. Each of the layers up to the Slice layer contains at its head a header code or a start code. That is, a bit stream has a Sequence_header_code (SHC), the GOP has a Group_start_code (GSC), the Picture has a Picture_start_code (PSC), and the Slice has a Slice_start_code (SSC). Each of the start codes consists of 32 bits which are byte-aligned and uniquely defined for each layer so that the start code can be used for detecting a position of the layer. On the other hand, the Macroblock layers and after contain several types of variable-length codes.

Here, in an ordinary MPEG decoder, analysis is started at the head of a bit stream and processing continues from the upper layers to the lower layers. Similarly, in a software processing in a microprocessor or the like, or in a hard-wired logic having a circuit for each processing, the processing is started at the head of a bit stream. More specifically, a header information is detected and extracted o be stored in an appropriate register so as to be used for a decode operation and operation control afterward. The bit stream analysis proceeds and reaches the variable-length code when the bit stream is entered into a variable-length code (Huffman code) table and a matched Huffman code is detected for decoding. In a Huffman code, a boundary of a code is unclear and accordingly, it is necessary to carry out a successive processing from the head of the bit stream. Thus, in general, decoding of a bit stream is, in principle, a successive decoding starting at the head. Especially in decoding a Huffman code, it has been considered impossible to carry out decoding in parallel.

On the contrary, according to the embodiment of the present invention, in a bit stream decoding processing such as MPEG, a parallel decoding of a bit stream has been realized for a high-speed processing by a first and a second bit stream analysis technique which will be detailed below. It should be noted that the first and the second bit stream analysis techniques are based on the same principle that a bit stream is divided into several sub streams so as to be processed in parallel using a plurality of decoders.

Description will now be directed to the first bit stream analysis technique. In this first bit stream analysis technique, an information on a bit stream boundary is obtained from a specific pattern which can be uniquely detected such as a start code, so that the bit stream is divided into several sub streams which are processed in parallel for realizing a high-speed processing. That is, the first bit stream analysis technique relates to a bit stream dividing method for dividing a processing by detecting a start code as a boundary of a continuous bit stream.

In a configuration for realizing this first bit stream analysis technique, start codes of an appropriate layer are detected from a bit stream inputted and the detected start codes are successively transmitted to different stream buffers. Bit streams read out from the respective stream buffers are transmitted to a block for carrying out a header analysis and Huffman code decoding, so that the respective bit streams are decoded independently from each other. The decoded results are re-arranged in a later stage so as to be in a correct order. The stard code used in the aforementioned bit stream division may be the aforementioned Picture start code (PSC), the Slice start code (SSC), and the like. Because in the MPEG, an inter-frame processing is involved, it is considered to be preferable to divide a bit stream on a lower level of the Slice layer. The present embodiment employs this Slice start code for dividing a bit stream.

The configuration for realizing this first bit stream analysis technique can be implemented in practice with an ordinary configuration by adding a simple circuit if it is possible to uniquely detect a start code with a guarantee that no malfunction occurs. However, if there is a possibility to detect a false start code (erroneous detection of a start code), it is necessary to guarantee that a start code detected is appropriate for a consistent division causing no contradictions afterward. If there should be caused a contradiction after a division, it is necessary to provide a mechanism for re-detection. Whether such a mechanism is required depends on the bit stream syntax configuration and decoder quality and reliability required.

Figure 2:
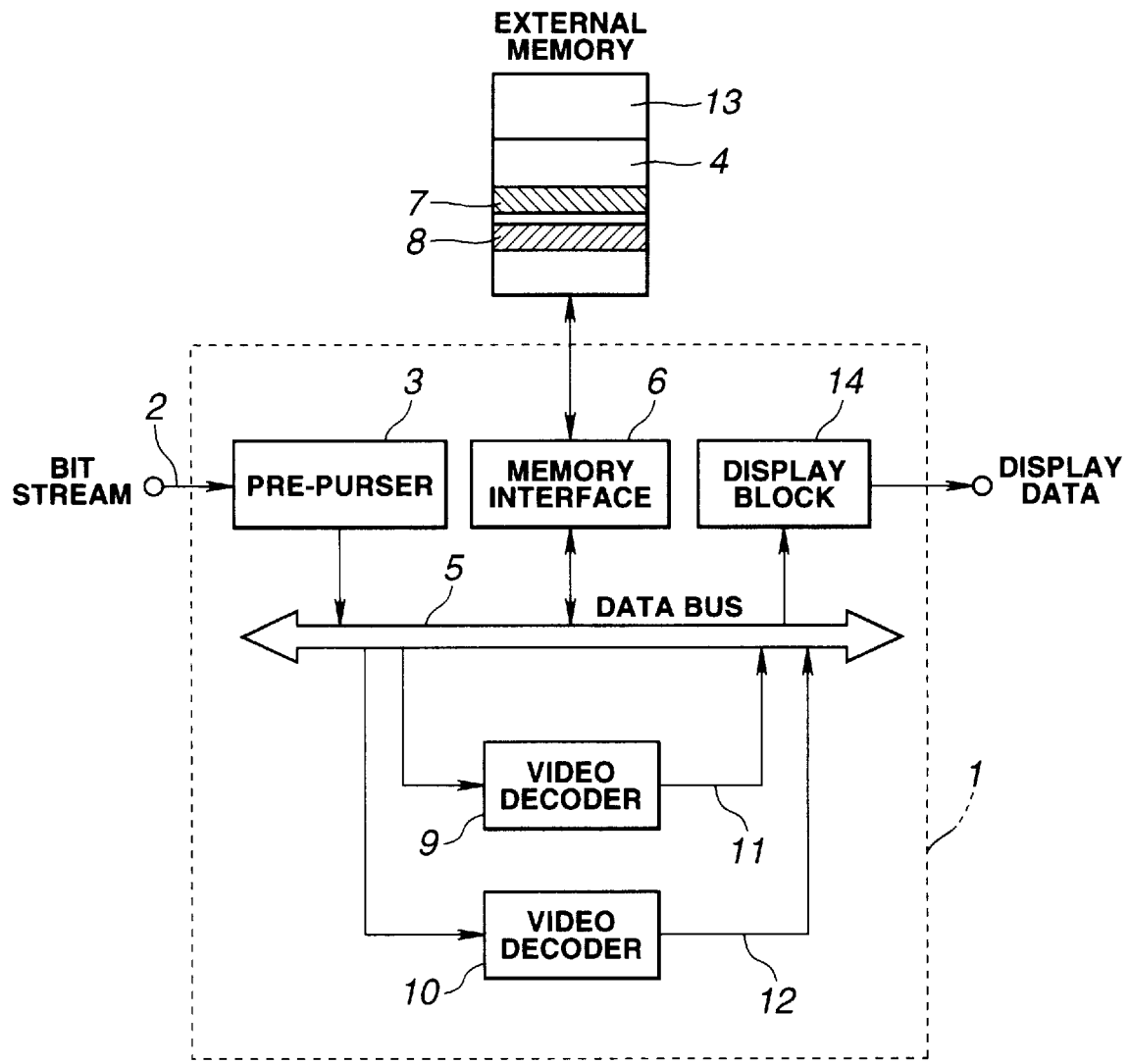
FIG. 2 is a block circuit diagram showing a specific configuration example of a first bit stream analysis technique applied to an MPEG video decoder.

FIG. 2 shows a specific configuration example of the aforementioned first bit stream analysis technique applied to an MPEG decoder. It should be noted that this configuration of FIG. 2 shows the MPEG applied to a video decoder. This configuration also includes other means and functions required for an ordinary video decoder such as a block associated with graphics and an audio decoder, although they have not been shown since they are irrelevant to the description of the present invention. Moreover, there can be considered various ways for realizing a decoder, but the example of FIG. 2 shows a decoder configuration including a single external memory, two video decoder blocks, and a bit stream divider required for realizing the bit stream analysis technique according to the present embodiment. Moreover, in the description below, a bit stream is divided on the Slice level as an example, into two sub streams for clarity of the description.

In this FIG. 2, an MPEG it stream 2 is inputted to an MPEG decoder 1 for realizing the aforementioned first bit stream analysis technique. This bit stream 2 is fed to a bit stream divider (hereinafter, referred to as pre-purser 3) to be divided into two sub streams as will be detailed later. These sub streams are written in bit stream buffer areas 7 and 8 of an external memory 4, respectively, via an internal data bus 5 and a memory controller (memory interface) 6.

The sub stream written in the aforementioned bit stream buffer area 7 is read out and fed via the memory controller 6 and the internal data bus 5 to a video decoder 9, whereas the sub stream written in the aforementioned bit stream buffer area 8 is read out and fed via the memory controller 6 and the internal data bus 5 to a video decoder 10, so as to be decoded.

After the decoding in the video decoder 9 and the video decoder 10, obtained data 11 and 12 are transmitted via the internal data bus 5 under control of the memory controller, again to the external memory 4 and written in an area 13 which is different from the aforementioned areas 7 and 8, for forming an image.

The image data in the area 13 which has been decoded and combined is read out from the external memory 4 and fed via the memory controller 6 and the internal data bus 5 to a display block 14. The display block 14 converts the image data into a display data and outputs the display data.

Here, the image combined in the area 13 is identical to a result of an ordinary decoding and is also fed to a block (not depicted) for carrying out an inter-frame processing (such as motion compensation).

FIG. 3 shows a bit stream division example in the aforementioned pre-purser 3 (bit stream divider) of FIG. 2.

FIG. 3B shows a bit stream 15 which is the bit stream 2 inputted in the aforementioned FIG. 2. This bit stream 15 is divided on Slice basis by the pre-purser 3 into two sub streams 16 and 17 shown in FIG. 3A and FIG. 3C. Here, those data (data 18 and 19) of higher layers than the Slice layer are included in one of these two sub streams. In the case of FIG. 3, the data 18 and 19 of the higher layers are included in the sub stream 16 as shown in FIG. 3A. Moreover, data 20 and 21 are data parts on slice basis sliced out from the previous bit stream 15. The bit streams thus divided are fed via the external memory 4 to the two video decoders 9 and 10 shown in FIG. 2 so as to be decoded.

Next, description will be directed to a second bit stream analysis technique. This second bit stream analysis technique divides a bit stream at a lower layer level than the aforementioned first bit sream analysis technique so that the divided data are processed in parallel for realizing a high-speed processing. That is, this second bit stream analysis technique relates to a bit stream division on the Huffman code level, wherein a bit stream is read out by way of pre-reading and a (continuous) matching with a Huffman code is used as an index to detect a boundary so that a decoding is carried out after the detection and results of decoding are combined in a later stage, thus decoding the entire bit stream.

Here, a Huffman code uniquely determines a decode result for a certain variable length of a bit stream entered. If a bit stream is inputted to a Huffman table, one and only one code is matched. The decoding using the Huffman code is carreid out successively, normally staring at the head of a bit stream. If a decoding is started in the middle of a bit stream, normally, no match is found in the Huffman table and no normal operation can be expected.

On the other hand, according to the second bit stream analysis technique of the present. invention, in dividing a bit stream on this Huffman code level, two functions are used: a function of Huffman code search with one-bit shift and a funcdtion of deciding that an initial Huffman code detection has been normal only after a continuous matching is obtained, and continuing operation. Note that if a Huffman code detection is started in the middle of a bit stream as has been described above, there may arise an erroneous matching with the Huffman table (hereinafter, matching with the Huffman table will be referred to as a hit) unless the code boundary is correct. In decoding is continued in this state, a contradiction will occur in some stage. Accordingly, the decision that the initial hit has been correct is made only after a certain number of hits occurred continuously after the initial hit. If a mismatch occurs before reaching this number, the start position is changed for carrying out a detection again.

As has been described above, in the second bit stream analysis technique of the present invention, apart from the processing of the head of a bit stream, a Huffman code search is started at an appropriate position of a bit stream and at a position of match with the Huffman code, a processing is started in another Huffman decoder and header processing block so that a parallel bit stream processing is carried out. After this, decoding results are combined at a later stage, assuring consistency.

Here, in the MPEG, several types of Huffman tables exist below the Macroblock layer. When a Huffman code search is started in the middle of a bit stream as has been described above, it is unknown which Huffman table is to be used. However, in the second bit stream analysis technique of the present invention, a comparison is carried out simultaneously with all (or a plurality) of the Huffman tables. In this simultaneous comparison, if there is one Huffman table of match, the decode operation is continued by using Huffman tables selected according to an appropriate order. If a contradiction occurs in the decoding, the decoding is repeated using a next Huffman table to be selected. Thus, appropriate Huffman tables are selected for decoding.

Figure 4:
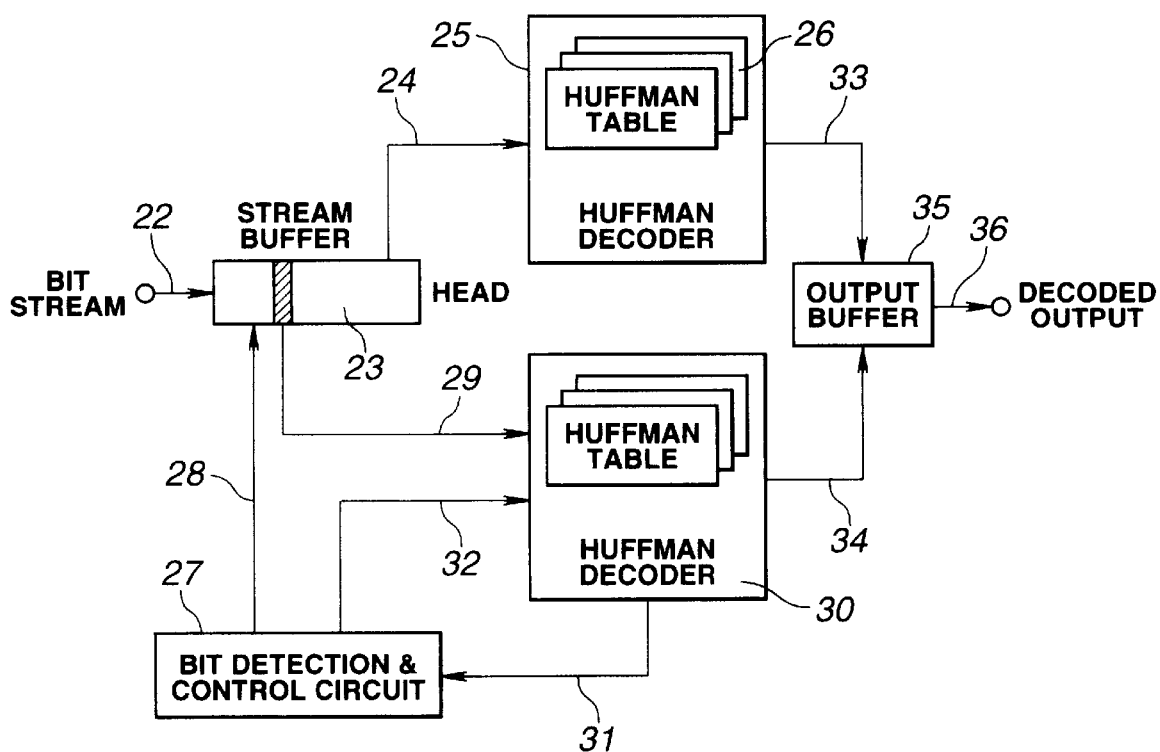
FIG. 4 is a block circuit diagram showing a specific example of a second bit stream analysis technique applied.

FIG. 4 shows a specific configuration example or application of the second bit stream analysis technique.

In this FIG. 4, a bit stream 22 is temporarily stored in a bit stream buffer 23 which is a FIFO memory (first-input first-output memory) and then read out so that a head data 24 of this bit stream 22 is fed to on of the Huffman decoders, i.e., a Huffman decoder 25. This Huffman decoder 25 contains several Huffman tables 26 and carries out decoding of the bit stream 24 supplied, starting at its head, including a header information search and Huffman decode processing.

Moreover, a hit detection and control circuit 27 detects the aforementioned Huffman code hit and controls the bit stream buffer 23. This hit detection and control circuit 27 causes to read out the bit stream starting at an appropriate position of the aforementioned bit stream buffer 23, so as to be fed to the other Huffman decoder 30. This Huffman decoder 30 also contains several Huffman tables and carries out search of match with a Huffman code to the aforementioned bit stream 29 while shifting by one bit, so as to find a Huffman code boundary. Here, if an initial match (hit) with the Huffman code is followed by detection of a predetermined number of hits, the Huffman decoder 30 supplies a hit signal 31 to the hit detection and control circuit 27. Upon reception of the hit signal 31, the hit detection and control circuit 27 reads out the bit stream 29 from the stream buffer 23, starting at a position (boundary position) corresponding to the hit signal 31, so that the bit stream 29 is supplied to the Hamann decoder 30. The Huffman decoder 30 starts a decode processing to the bit stream 29.

Data 33 and 34 as the decoded results from the two Huffman decoders 25 and 30 are written at appropriate positions of an output buffer 35 so as to be combined with each other for output as an output data 36. The combining method in ths output buffer 35 managed according to an information on the bit stream analysis result, the read out position, and the like.

It should be noted that in the example of this FIG. 4, explanation has been given on a data handling only at the Huffman code level. Actually, however, a bit stream has various types of header information and the present invention can be applied to any of these header information. Although omitted in the explanation above, these header processing may also be involved in the Huffman decoders 25 and 30.

Moreover, the stream buffer 23 and the output buffer 35 of FIG. 4 may be provided in an external memory similarly as the example of the aforementioned FIG. 2.

As has been described above, the aforementioned two bit stream analysis techniques, i.e., the first and the second bit stream analysis techniques enables to realize a parallel processing of a bit stream, answering to the requirement for a high-speed processing. That is, by using a variable-length code decoder, it is possible to easily decode a bit stream at a higher rate with a conventional operation speed and design technique. Moreover, the embodiments of the present invention not only realize a high-rate processing but enale a high-rate processing with a lower speed processing, which contributes to reduction in voltage and power consumption.

Moreover, in the explanation of the embodiments of the present invention, a bit stream is divided into two sub streams which are processed in separate circuits. However, it is also possible to realize this basic principle of dividing a bit stream while sharing a part of hardware.

Furthermore, in the second bit stream analysis which has the function of Huffman table hit detection and the function of bit stream shift, it is possible to realize a bit stream error processing by using these functions.

As is clear from the aforementioned, in the bit stream analyzing method and apparatus according to the present invention, a specific code pattern of a unit is detected and according to this detection, a bit stream is divided into a plurality of sub streams, which are decoded separately before being combined with consistency. Thus, in analyzing a bit stream and decoding a variable-length code which are to be carried out successively, it is possible to enhance the processing performance without requiring a high-speed clock or a high-speed circuit technique.

Moreover, in the bit stream analyzing method and apparatus according to the present invention, a data in the middle of a bit stream is shifted by one bit to be compared with a Huffman table to detect whether matched. Accoridng to the detection result, a boundary position of the Huffman code is detected. A data which has been decoded from the head position of the bit stream is combined with the data decoded from the boundary position. Thus, in analyzing a bit stream and decoding a variable-length code to be successively processed, it is possible to enhance the processing performance without requiring a high-speed clock or a high-speed circuit technique.

That is, according to the present invention, it is possible to realize a parallel processing of a bit stream, answering to the requirement for a high-speed processing, which enables to easily decode a bit stream at a higher rate with a conventional operation speed and design technique. Moreover, according to the present invention, it is possible not only to realize a high-rate processing but also a high-rate processing with a low-rate processing, enabling to reduce the voltage and power consumption.

What is claimed is:

1. A bit stream analyzing method for analyzing a video bit stream of MPEG encoded data comprising the steps of:

detecting a slice header code for each slice unit of the MPEG encoded video bit stream;

dividing said bit stream into a plurality of sub streams according to the detection of said slice header code;

decoding said plurality of sub streams separately from each other; and combining said plurality of sub streams which have been decoded into a decoded video bit stream.

2. A bit stream analyzing method as claimed in claim 1, said method further comprising:

a step of continuously repeating a predetermined operation by a predetermined number of times after detection of said specific pattern;

a step of carrying out decode operation if no error has occurred in said continuous predetermined operations, and a step of detecting said specific code pattern from a new position if an error has occurred in said continuous predetermined operations.

3. A bit stream analyzing apparatus for analyzing a video bit stream of MPEG encoded data comprising:

detecting means for detecting a slice header code for each slice unit of the MPEG encoded video bit stream;

dividing means for dividing said bit stream into a plurality of sub streams according to the detection of said slice header code;

decoding means for decoding said plurality of sub streams separately from each other; and control means for combining said plurality of sub streams which have been decoded into a decoded video bit stream.

4. A bit stream analyzing apparatus as claimed in claim 3, wherein a predetermined operation is repeated by a predetermined number of times after detection of said specific pattern; and if no error has occurred in said continuous predetermined operations, a decode operation is carried out, and if an error has occurred in said continuous predetermined operations, detection of said specific code pattern is tried again from a new position.

5. A bit stream analyzing method for analyzing a bit stream containing a Huffman-coded compressed data, said method comprising:

a first decode step for decoding said bit stream, starting at a head of said bit stream;

a match detection step for shifting a data in the middle of said bit stream so as to be compared with a Huffman table to detect whether a match is present;

a boundary detection step for detecting a boundary of a Huffman code according to a result of said match detection;

a second decode step for decoding a data starting at said boundary position of said bit stream; and a combine step for combining a result of said first decode step starting at the head of said bit stream with a result of said second decode step starting at said boundary position of said bit stream.

6. A bit stream analyzing method as claimed in claim 5, wherein said match detection step is carried out by simultaneous comparison with a plurality of types of Huffman tables so that a matched Huffman table is used for continuing the match detection within a predetermined range and if an error is caused in the match detection in said predetermined range, control is returned to said step of one-bit shift and comparison with a Huffman table.

7. A bit stream analyzing apparatus for analyzing a bit stream containing a Huffman-coded compressed data, said apparatus comprising:

first decode means for decoding said bit stream, starting at a head of said bit stream;

match detection means for shifting a data in the middle of said bit stream so as to be compared with a Huffman table to detect whether a match is present;

boundary detection means for detecting a boundary of a Huffman code according to a result of said match detection;

second decode means for decoding a data starting at said boundary position of said bit stream; and combine means for combining a result of said first decode step starting at the head of said bit stream with a result of said second decode step starting at said boundary position of said bit stream.

8. A bit stream analyzing apparatus as claimed in claim 7, wherein said match detection means carries out simultaneous comparison with a plurality of types of Huffman tables so that a matched Huffman table is used for continuing the match detection within a predetermined range and if an error is caused in the match detection in said predetermined range, said step of one-bit shift and comparison with a Huffman table is carried out.

* * * * *